US010195540B2

(12) United States Patent
Jansen (10) Patent No.: US 10,195,540 B2
(45) Date of Patent: Feb. 5, 2019

(54) MODULAR SUB-UNIT FOR A SUSPENSION CRYSTALLIZATION SYSTEM (71) Applicant: Sulzer Chemtech AG, Winterthur (CH)

(72) Inventor: Halbe Anne Jansen, Eschlikon (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 15/127,968

(22) PCT Filed: Dec. 10, 2014

(86) PCT No.: PCT/EP2014/077202
§ 371 (c)(1),
(2) Date: Sep. 21, 2016

(87) PCT Pub. No.: WO2015/144266
PCT Pub. Date: Oct. 1, 2015

(65) Prior Publication Data
US 2017/0095752 A1     Apr. 6, 2017

(30) Foreign Application Priority Data
Mar. 28, 2014 (EP) .................................... 14162405

(51) Int. Cl.
*B01D 9/00*     (2006.01)
(52) U.S. Cl.
CPC .......... *B01D 9/005* (2013.01); *B01D 9/0013* (2013.01); *B01D 2009/0086* (2013.01)
(58) Field of Classification Search
CPC ......... B01D 9/00; B01D 9/005; B01D 9/0013
USPC ...................................................... 23/295 R
See application file for complete search history.

(56) References Cited

U.S. PATENT DOCUMENTS

| | | |
|---|---|---|
| 3,283,522 A | 11/1966 | Ganiaris |
| 3,872,009 A | 3/1975 | Thijssen |
| 3,992,900 A | 11/1976 | Campbell |
| 4,004,886 A | 1/1977 | Thijssen et al. |
| 4,091,635 A | 5/1978 | Ogman |
| 4,316,368 A | 2/1982 | Van Pelt et al. |
| 4,430,104 A | 2/1984 | Van Pelt et al. |
| 4,459,144 A | 7/1984 | Van Pelt et al. |
| 4,481,169 A | 11/1984 | Van Der Malen |
| 4,787,985 A | 11/1988 | Roodenrijs et al. |
| 5,062,862 A | 11/1991 | Jansen |

(Continued)

FOREIGN PATENT DOCUMENTS

| | | |
|---|---|---|
| EP | 1245951 A1 | 10/2002 |
| EP | 1398064 B1 | 7/2005 |

(Continued)

*Primary Examiner* — Edward M Johnson
(74) *Attorney, Agent, or Firm* — Larson & Anderson, LLC (57) ABSTRACT A modular sub-unit for the production of crystals in a suspension crystallization system includes: a first crystallization segment, at least one further crystallization segment, a first mixing segment, optional further mixing segments, an inlet cap, an outlet cap. The inlet cap and outlet cap are in fluid communication with any crystallization segments and any mixing segments present within the sub-unit. The sub-unit further includes a central rotating axis for providing mechanical energy to the crystallization segments and preferably the mixing segments. The crystallization segments present in the sub-unit are separated from each other by a mixing segment. Also described are a suspension crystallization system which includes the sub-unit and a suspension crystallization process making use of the sub-unit.

14 Claims, 6 Drawing Sheets

(56) References Cited

U.S. PATENT DOCUMENTS 6,241,954 B1 6/2001 Jansen et al.
6,719,954 B2 4/2004 Jansen

FOREIGN PATENT DOCUMENTS

| GB | 1453645 A | 10/1976 |
|----|-----------|---------|
| WO | 2008113386 A1 | 9/2008 |
| WO | 2008155640 A1 | 12/2008 |

MODULAR SUB-UNIT FOR A SUSPENSION CRYSTALLIZATION SYSTEM

BACKGROUND OF THE INVENTION

The present invention relates to a modular sub-unit for the production of crystals in a suspension crystallization system. The present invention also relates to a suspension crystallization system comprising said sub-unit and a suspension crystallization process using said modular sub-unit or said suspension crystallization system.

Suspension crystallization and crystallizers find many applications in the purification and concentration of components of mixtures and other compositions, particularly in the food (freeze concentration) and the chemical industries, including waste water treatment.

The largest cost factor in suspension crystallization is the crystallizer, which has an inner wall on which scrapers are running. Small suspension crystallizers have an expensive, finely machined inner wall optimized for scraping, which allows for high heat-exchange loads per square meter of scraped surface.

Larger suspension crystallizers and higher throughput are technically quite challenging because it is difficult to maintain a constant and uniform contact of the scraper with large surface area walls. Therefore the scraping of the wall for large crystallizers is often not sufficient because for economical/technical reasons it is not possible to machine the large surface area wall. Achieving a uniform touching of the scraper would require precise machining using custom-built special large machining devices. This makes such large crystallizers unsuitable or too expensive for use in applications having a high concentration of crystallizing component in the mother liquor because under these conditions crystals are strongly attached to the wall. If not perfectly scraped, a crystal layer will form on the wall leading to knife damage, high nucleation rates and a loss of heat transfer and thus capacity. However interest in the field of end purification of chemicals is to go to higher concentration of crystallizing component in the mother liquor, which causes crystals to adhere firmly to the wall, and therefore a uniform scraping is extremely important. WO 2008/113386 discloses a crystallizer for simultaneous crystallization of salt and water in an aqueous salt solution consisting of several adjacent crystallization modules arranged to provide a large scraped cooled surface. This crystallizer is provided with two separate slurry outlets, one at the top for ice crystals and one at the bottom for salt crystals, and therefore this crystallizer is specifically designed for use with aqueous systems only. Although the disclosed crystallizer allegedly has a large scraped cooled surface and relatively high heat transfer capacity, it suffers from problems associated with poor mixing, stagnant zones and crystal agglomeration. Additionally one skilled in the art will recognize that uniform scraping of the disclosed coaxial cooled surfaces within a module is challenging due to the complicated arrangement of the cooled surfaces. In large crystallizers, including the above disclosed crystallizer, mixing of the suspension layer at the wall, where heat transfer occurs and new crystals are formed, is poor resulting in a buildup of crystals around the scraper construction. Conventionally, as for example, disclosed in EP1398064B1, U.S. Pat. Nos. 3,283,522, and 4,316,368, the problem of poor mixing at the wall is addressed by means of expensive and mechanically complex designs having high maintenance and operation costs. One example is a system having a counter-rotating coaxial mixer and scrapers and independent dual drive systems, one for the scrapers and one for the mixer. Equally complex and expensive are constructions based on a draft tube and mixer. Employing either of these designs cause the manufacturing and maintenance costs to rise steeply.

Some example suspension crystallizers consisting of a crystallization section and a mixing section are known, such as those disclosed in WO 2008/155640 A1 or U.S. Pat. No. 6,241,954. However when such crystallizers are built on a large scale, they suffer from the above described problems such as lack of efficient mixing and effective scraping.

The above-discussed problems related to poor mixing and crystal agglomeration may often result in further problems of crystal blockage inside the crystallizer. Dealing with such blockages requires regular defrosting, which is disadvantageously time consuming and requires operator attention.

Therefore, it would be useful to have an improved design for suspension crystallization systems, particular larger and higher throughput ones, that have improved mixing and wall scraping properties without the mechanical, operational and maintenance complexity and costs associated with the prior art systems. Additionally it would be desirable to have a crystallizer design solution that would simplify the manufacture of a variety of crystallizer sizes, all having favorable mixing and wall scraping performance. Also desirable would be to have a simple suspension crystallization process making use of such systems and their sub-units without requiring extensive defrost cycles (periodic heating of the crystallizer to melt crystal agglomerates that have formed during operation) and maintenance and/or operational complexity.

SUMMARY OF THE INVENTION

Starting from this state of the art, it is an object of the invention to provide an improved sub-unit for the production of crystals in a suspension crystallization system that does not suffer from the previously mentioned deficiencies, particularly a lack of effective mixing and scraping, especially for larger systems and higher throughputs. Additional objects are to provide a suspension crystallization system and process having these same advantages.

According to the invention, these objects are achieved by a modular sub-unit for the production of crystals in a suspension crystallization system, said sub-unit comprising:
A first crystallization segment having:
 a first inlet,
 a cooling means for cooling a slurry at a cooled surface to promote crystal formation and growth,
 a crystal-growing volume sufficient for the growth of said crystals,
 a mechanical scraping means for scraping the cooled surface and/or mixing a layer adjacent to the cooled surface together with a bulk of the slurry,
 a first outlet,
A first mixing segment having:
 a second inlet,
 a mechanical mixing means for mixing the slurry from the crystallization segment and/or reducing the size of any crystal agglomerations, if present,
 a second outlet,
wherein the crystallization segment and the mixing segment are in fluid communication with each other by means of the first outlet of the crystallization segment and the second inlet of the mixing segment,
An inlet cap comprising a main supply conduit for the sub-unit and having a third outlet, An outlet cap comprising a main discharge conduit for the sub-unit and having a third inlet, and A central rotating axis for providing mechanical energy for the mechanical scraping means of the crystallization segment, and preferably also for the mechanical mixing means of the mixing segment, and At least one further crystallization segment additional to the first crystallization segment, Optionally at least one further mixing segment additional to the first mixing segment, wherein the first crystallization segment and any further crystallization segments present in the sub-unit are all separated from each other by means of the first mixing segment or a further mixing segment, if present, and wherein the central rotating axis provides energy for a mechanical scraping means of any further crystallization segments, and preferably also for a mechanical mixing means of any further mixing segments, and wherein the inlet cap is in fluid communication with any crystallization segments and any mixing segments present within the sub-unit by means of the third outlet, and wherein the outlet cap is in fluid communication with any crystallization segments and any mixing segments within the sub-unit by means of the third inlet.

The inventors have surprisingly found that said modular sub-units may be used for the production of suspension crystallization systems having a large variety of sizes, all manufactured using relatively simple and cost-effective methods and designs, and all having favourable mixing and scraping properties in their operation. Thus the sub-unit and suspension crystallization systems based on it are significantly improved over those of the prior art. In particular, the walls are sufficiently small so that they may be smoothly and precisely machined without requiring complex equipment and operations, and thus the scraping performance is high. Additionally, it has been found that the presence of mixing segments between crystallization segments in the modular sub-unit significantly favours the mixing performance, reducing problems associated with stagnant zones and crystal agglomeration. The modular sub-units with their favourable mixing and scraping properties also allow for a single central rotating axis to provide the mechanical energy for the mechanical scraping means and preferably also for the mechanical mixing means in the sub-units, thus simplifying the construction, operation and maintenance.

The further object of a suspension crystallization system, comprising the modular sub-unit, is provided when the sub-unit is in fluid communication with at least one separating means for separating a crystal phase from a fluid phase. Such a separating means allows the separation of the product and allows the sub-unit to be integrated in a process design.

Another object of a suspension crystallization process, using the modular sub-unit or the suspension crystallization system of the invention, is obtained by a process comprising the steps of:

cooling a slurry at the cooled surface of the first crystallization segment to promote formation and growth of crystals, growing of crystals in the first crystallization segment using a mechanical scraping and/or mixing means to scrape the cooled surface and/or to mix a layer adjacent to the cooled surface together with a bulk of the slurry, using a first mixing segment to mix the slurry from the first crystallization segment prior to feeding the slurry to the further crystallization segment, using the at least one further crystallization segment to cool the slurry from the first mixing segment to promote further formation and growth of crystals, growing of crystals in the further crystallization segment and optionally using further mixing segments, if present, to mix the slurry between further crystallization segments, if present.

These further objects of the invention share the advantages obtained by the modular sub-unit of the invention, namely favourable mixing and scraping properties. In addition, the system of the invention may be relatively easily and inexpensively manufactured in a variety of sizes and configurations due to the ability to readily machine the walls of the sub-unit and to create assemblies of sub-units. Furthermore the process of the invention may advantageously reduce the size of any crystal agglomerations, if present.

In one embodiment, the modular sub-unit has a substantially circular cross-section and wherein at least a part of a cylindrical wall of said first crystallization segment comprises said cooled surface. This embodiment has the advantages that substantially circular shapes are relatively easy to smoothly machine versus other shapes. Also circular forms are relatively easy to scrape versus square forms and other shapes. One skilled in the art will understand that it would likewise be beneficial for any further crystallization segments present if at least a part of their cylindrical wall also comprises a cooled surface.

In another embodiment the first crystallization segment, the first mixing segment, the at least one further crystallization segment and any optional further mixing segment, if present, and the inlet and outlet caps are all in substantially vertical or substantially horizontal arrangement to one another, preferably substantially vertical. Vertical arrangements of segments advantageously distribute the forces and support the weight throughout the entire sub-unit versus horizontal or other arrangements. Vertical arrangements are also advantageous for maintenance work by facilitating the disassembly and re-assembly of components by a crane, and vertical arrangements also act to reduce the footprint of the sub-unit and systems based on it.

In still another embodiment, the orientation is substantially vertical and the inlet cap is either at a top of the sub-unit or at a bottom of the sub-unit. The first alternative configuration is advantageous for purification or concentration process applications in which the crystal phase of the substance to be crystallized has a higher density than its liquid phase, and the second alternative configuration is advantageous for purification or concentration process applications in which the crystal phase of the substance to be crystallized has a lower density than its liquid phase. These configurations take the effects of gravity into optimum consideration.

The modular sub-unit has at least one further crystallization segment additional to the first crystallization segment. In still yet another somewhat related embodiment, the modular sub-unit has at least one further mixing segment additional to the first mixing segment. The inclusion of additional segments increases the flexibility and capacity of the sub-unit. As indicated earlier, crystallization segments will always be separated from one another by means of a mixing segment.

In a further embodiment of the modular sub-unit, the first mixing segment or a further mixing segment comprises a filtering means suitable for extracting a stream from the sub-unit having a reduced crystal content, preferably substantially crystal free, from the slurry within said mixing segment. One skilled in the art will understand that the crystal content may be determined based on conventional methods including visual observation, optical microscopy, and turbidity measurement.

In one embodiment of the modular sub-unit for a single stage process, all of the crystallization segments, all of the mixing segments, the inlet cap, and the outlet cap are all in fluid communication, and the fluid communication is embodied so as to not require interconnecting external piping. Avoiding external piping simplifies construction, maintenance and sealing. An integrated modular system provides savings on the drive and piping. Furthermore indirect fluid communication via external piping and pumps cannot mix as well as the direct fluid communication of segments.

In another embodiment of the modular sub-unit, at least a first and a further crystallization segment are not in direct fluid communication with each other due to the presence of an intervening wall, and indirect communication between said not-directly communicating crystallization segments is provided via external piping. This embodiment facilitates an inexpensive, simple and robust construction of crystallization systems for multi-stage processes by making standardized modular sub-units available for such constructions. It is advantageous to allow the multi-stage process to be carried out in one modular sub-unit, thus avoiding the use of multiple crystallizers with their associated pipes and pumps and their related disadvantages. In a related specific embodiment, the modular sub-unit is embodied for a use in which the total number of process stages equals the number of intervening walls plus one.

In an embodiment of the process of the invention, a conditioning step of a slurry within the sub-unit is carried out within the first or a further mixing segment. Feeding relatively warm feed in this manner causes the smaller crystals to melt, which improves a subsequent solid-liquid separation step in a separating means.

In another embodiment of the process, the sub-unit is in fluid communication with one or more separating means for separating a crystal phase from a fluid phase, and the process comprises the additional step of separating a crystal phase from a fluid phase.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more modular sub-unit or suspension crystallization system claims or the subject matter of a mixture of one or more process claims and sub-unit or system claims. By analogy, the subject matter of any one sub-unit or system claim may be combined with the subject matter of one or more other sub-unit or system claims or the subject matter of one or more process claims or the subject matter of a mixture of one or more sub-unit or system claims and process claims. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned process embodiments may be combined with the subject matter of one or more of the other above-mentioned sub-unit or system embodiments or vice versa without limitation so long as technically feasible.

BRIEF DESCRIPTION OF THE DRAWINGS

The invention will be explained in more detail hereinafter with reference to various embodiments of the invention as well as to the drawings. The schematic drawings are.

DETAILED DESCRIPTION OF THE INVENTION

Definitions

As used in the specification and claims of this application, the following definitions, should be applied:

"a", "an", and "the" as an antecedent may refer to either the singular or plural unless the context indicates otherwise.

An "intervening wall" substantially blocks fluid flow between adjacent segments by providing a liquid-tight sealing.

"substantially circular" means including deviations from the circular shape within the tolerances of the applied manufacturing method.

"substantially vertical" or "substantially horizontal" means the center line is within 5 degrees of the vertical or horizontal, respectively.

The term "slurry" may refer to either the initial feed solution or suspension or slurry produced in the process. The term "fluid" refers to the mother liquor, a term used widely in the chemical industry, or the concentrate, a term used widely in the food and beverage industry.

"wt %" means weight percent of crystals in the slurry.

"Reduced crystal content" means less than or equal to 5, preferably 4, more preferably 3, most preferably 2 wt % and "substantially crystal free" means less than or equal to 1 wt %.

A "conditioning step" means feeding a relatively warm feed to a modular sub-unit via a first or a further mixing segment.

Numerical values in the present application relate to average values. Furthermore, unless indicated to the contrary, the numerical values should be understood to include numerical values which are the same when reduced to the same number of significant figures and numerical values that differ from the stated value by less than the experimental error of the conventional measurement technique of the type described in the present application to determine the value.

The invention will now be explained in more detail with reference to the drawings. FIG. 1 is a schematic illustration of two embodiments of a modular sub-unit 1. The modular sub-units 1, shown have one crystallization segment 100, one mixing segment 200, an inlet cap 300, an outlet cap 400, and a central rotating axis 500. In other embodiments additional segments may be present. One skilled in the art will understand that the modular sub-unit 1 will typically be fed with a crystal-free solution at the start of the process. As the process progresses and crystal formation begins, a suspension or slurry will be formed.

The crystallization segment 100 is equipped with a first inlet 101, a cooling means 102, a crystal-growing volume 103, a mechanical scraping means 104, and a first outlet 105. Said cooling means 102 enables the cooling-down of the slurry at a cooled surface 1021, which leads to the formation of crystals thereon. Suitable cooling means include conventional methods such as circulating a refrigerant such as glycol or using air cooling. One skilled in the art will understand that a suitable crystal-growing volume 103 sufficient for crystal growth may be selected based on the process conditions to be used. The mechanical scraping means 104 enables the scraping-off of the newly formed crystals at said cooled surface and promotes the mixing of the layer near the cooled surface 1021 with the bulk of the slurry. Suitable mechanical scraping means include blades.

The mixing segment 200 is provided with a second inlet 201, a mechanical mixing means 202 and a second outlet 203. Said mixing means 202 prevents stagnant zones (i.e. zones where crystals do not move relative to each other) and reduces or prevents formation of thick lumps or crystal agglomerates, whose presence can be tested by means of, e.g., sieving, optical microscopy or laser diffraction. Suitable mechanical mixing means 202 in the present invention may comprise one or more stirrers, one or more baffles or combinations thereof. If the mechanical mixing means 202 includes a stirrer, the stirrer will be connected to the central rotating axis 500. Baffles are advantageous because they are simple to construct and they effectively break the rotational movement of the slurry which is caused by rotating mechanical scraping means 104 or stirrers.

The slurry is supplied to the modular sub-unit 1 via the inlet cap 300 comprising a main supply conduit 301. The slurry can be carried from the inlet cap 300 via a third outlet 302 to the first inlet 101 of the crystallization segment 100. The slurry can be drawn from the crystallization segment 100 via the first outlet 105 and be carried to the mixing segment 200 via the second inlet 201. The resulting mixture can be drawn from the mixing segment 200 via the second outlet 203 and introduced to the outlet cap 400 via a third inlet 402. To this end, the slurry is drawn from the modular sub-unit 1 via the main discharge conduit 401.

The central rotating axis 500 provides the mechanical energy for the mechanical scraping means 104 of the crystallization segment 100, and preferably for the mechanical mixing means 202 of the mixing segment 200. The central rotating axis 500 may be suitably powered by conventional means such as an electrical motor.

Each segment of the modular sub-unit 1 may preferably be standardized and substantially circular in order to yield manufacturing and cost advantages. The various segments (e.g. 100 and 200) and caps (i.e. 300 and 400) of the modular sub-unit 1 may be arranged either substantially vertical or substantially horizontal to one another, preferably substantially vertical. As described above, the segments (e.g. 100 and 200) and caps (i.e. 300 and 400) of the modular sub-unit 1 may preferably be in direct fluid communication with each other, i.e., such that the respective outlet and inlet are directly connected to each other.

Figure 1A:
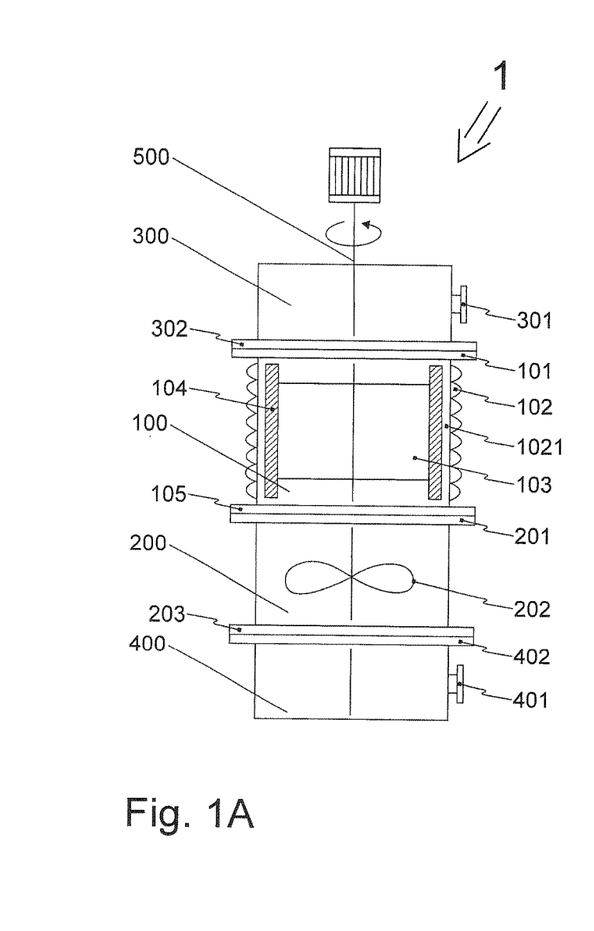
FIG. 1 shows two schematic views (A, B) of an embodiment of a modular sub-unit equipped with a crystallization segment and a mixing segment.
Figure 1B:
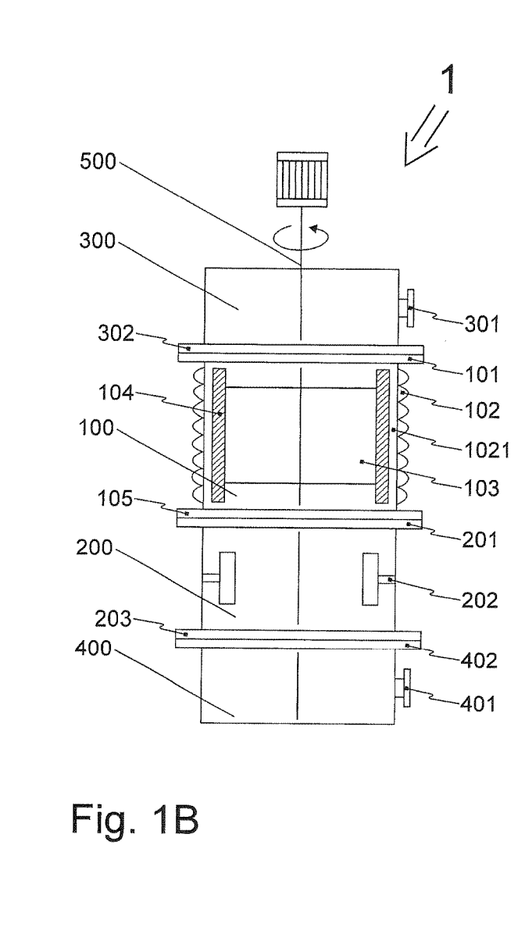

FIG. 1A schematically represents the modular sub-unit 1 having a stirrer as the mechanical mixing means 202, whereas FIG. 1B shows a modular sub-unit 1 having baffles as the mechanical mixing means 202.

Additional information on crystallizers and their operation is disclosed in Handbook of Industrial Crystallization, 2nd Edition, by Allan S. Myerson, published Jan. 9, 2002 by Butterworth-Heinemann, Woburn, Mass. ISBN: 978-0750670128 and Crystallization Technology Handbook, 2nd Edition, edited by A. Mersmann, published 2001 by Marcel Dekker, Basel, ISBN: 0-8247-0528-9.

FIG. 2 is a schematic illustration of an embodiment of a modular sub-unit 1 according to the present invention. Here, the modular sub-unit 1 described in FIG. 1 comprises one further crystallization segment 110 substantially identical to the first crystallization segment 100 and separated from the first crystallization segment 100 by the first mixing segment 200. Likewise, the modular sub-unit 1 can be equipped with at least one further mixing segment 210 (not shown), preferably substantially identical to the first mixing segment 200. Likewise further crystallization segments 110 can be added (not shown), and, as described earlier, crystallization segments will always be separated from each other by means of mixing segments, as shown also in FIGS. 2 to 5. One or more of said mixing segments (200, 210) may additionally comprise a filtering means 2001 suitable for extracting a stream from the modular sub-unit 1 having a reduced crystal content, preferably substantially crystal free, from the slurry within said mixing segment. One skilled in the art will understand that the inclusion of further mixing segments (210) or further crystallization segments (110) will require additional inlets and outlets for said further segments.

Figure 2A:
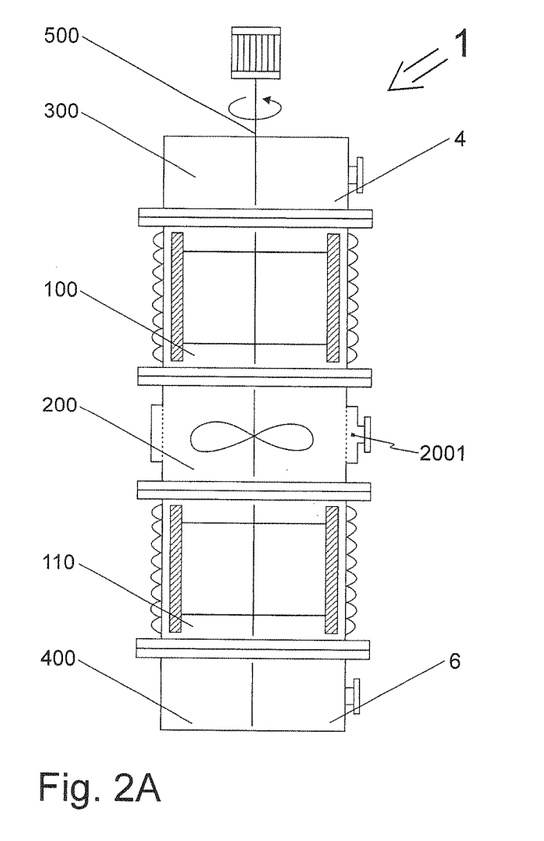
FIG. 2 shows two schematic views (A, B) of an embodiment of a modular sub-unit according to the invention equipped with a first crystallization segment, a first mixing segment, one further crystallization segment, a filtering means, and an inlet either at the top (A) or at the bottom (B) of the sub-unit.
Figure 2B:
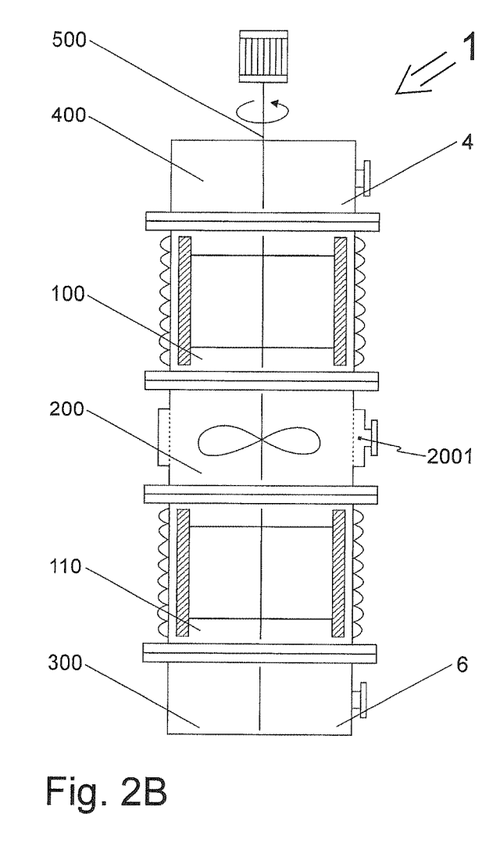

The sub-unit 1 of FIG. 2B is for use with systems in which the crystals (e.g. frozen water) have a lower density than the liquid phase, whereas the sub-unit 1 of FIG. 2A is for use with systems in which the crystals have a higher density than the liquid phase. FIG. 2A and FIG. 2B differ in the arrangement of the inlet and outlet caps, 300 and 400.

Figure 3:
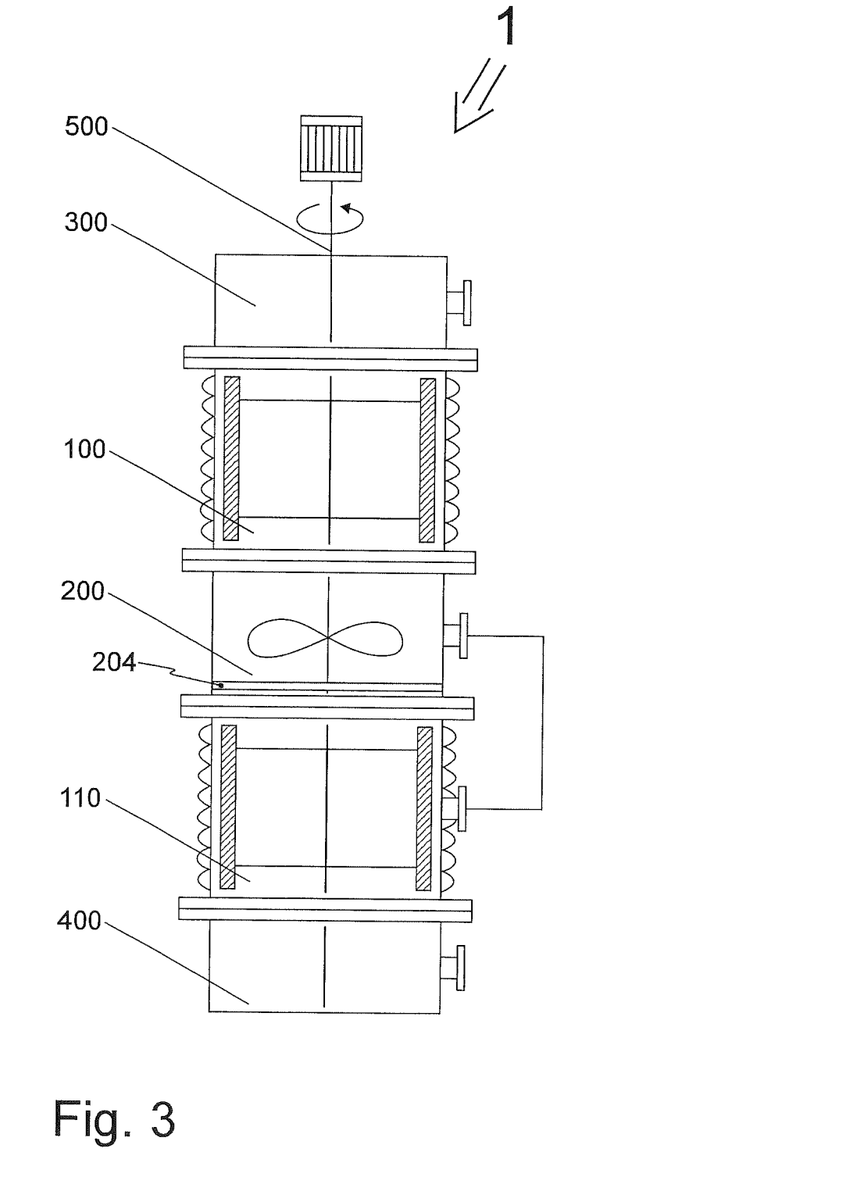
FIG. 3 shows a schematic view of an embodiment of a modular sub-unit according to the invention suitable for a 2-stage process having an intervening wall and external piping.

FIG. 3 is a schematic illustration of another preferred embodiment of a modular sub-unit 1 to the present invention. Here, the first mixing segment 200 of the modular sub-unit 1 described in FIG. 1 additionally comprises an intervening wall 204, which prevents direct fluid communication with one further crystallization segment 110 substantially identical to the first crystallization segment 100. Instead, indirect fluid exchange between said not-directly communicating segments is provided via external piping components.

Figure 4:
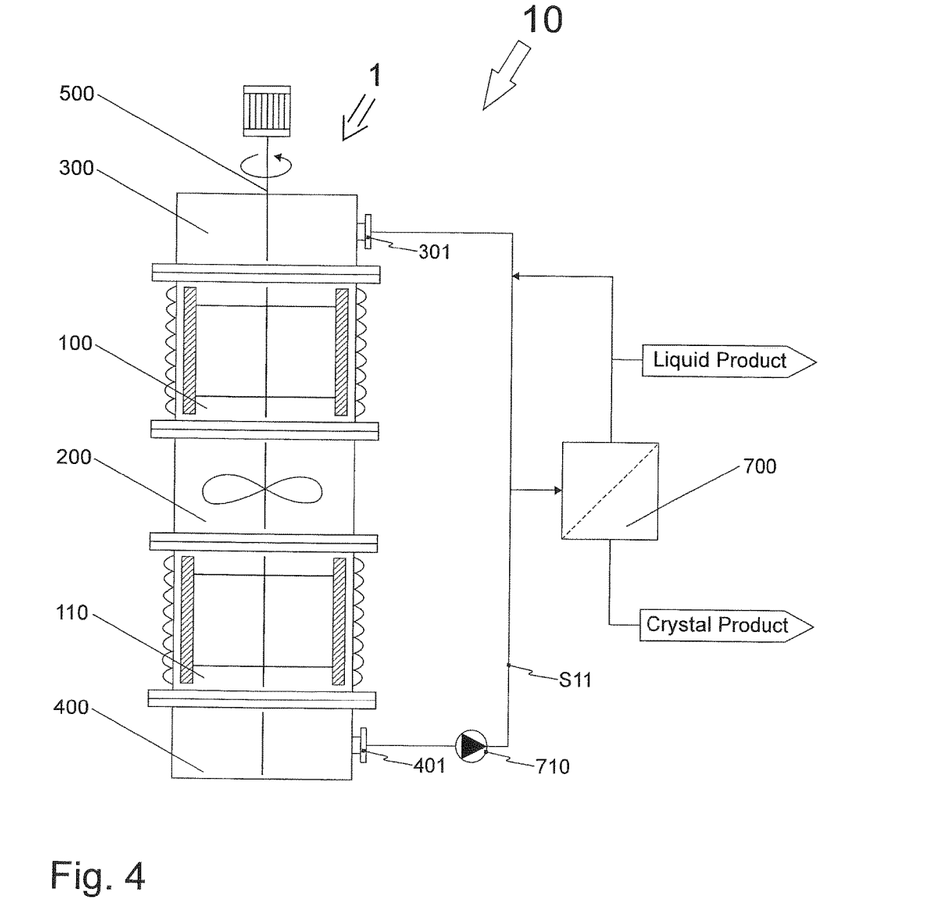
FIG. 4 shows a schematic view of an embodiment of a suspension crystallization system according to the invention.

FIG. 4 shows an embodiment for a suspension crystallization system 10 comprising the modular sub-unit 1. The basic operation of the system is described in U.S. Pat. No. 6,719,954, which is incorporated herein by reference. Here, the modular sub-unit 1 is in fluid communication with at least one separating means 700 for solid-liquid separation of a side-stream of the circulating slurry. In order to achieve circulation, the suspension crystallization system according to the invention comprises an external circuit loop having a pipe S11 and a circulation pump 710. Said pipe S11 is connected with the modular sub-unit 1, at one end via the main supply conduit 301 and at the other end via the main discharge conduit 401 in this embodiment. Separating means 700 may be a hydro cyclone, a centrifuge, a wash column, or a filter. Individual sub-units 1 may have the same or different separating means 700 for the case of multistage systems, as shown later in FIG. 5. In the separating means 700, the crystals are separated from the liquid phase. Subsequently part of the liquid phase can be removed from the system. The remaining slurry is reintroduced into the modular sub-unit 1 for further processing.

Figure 5:
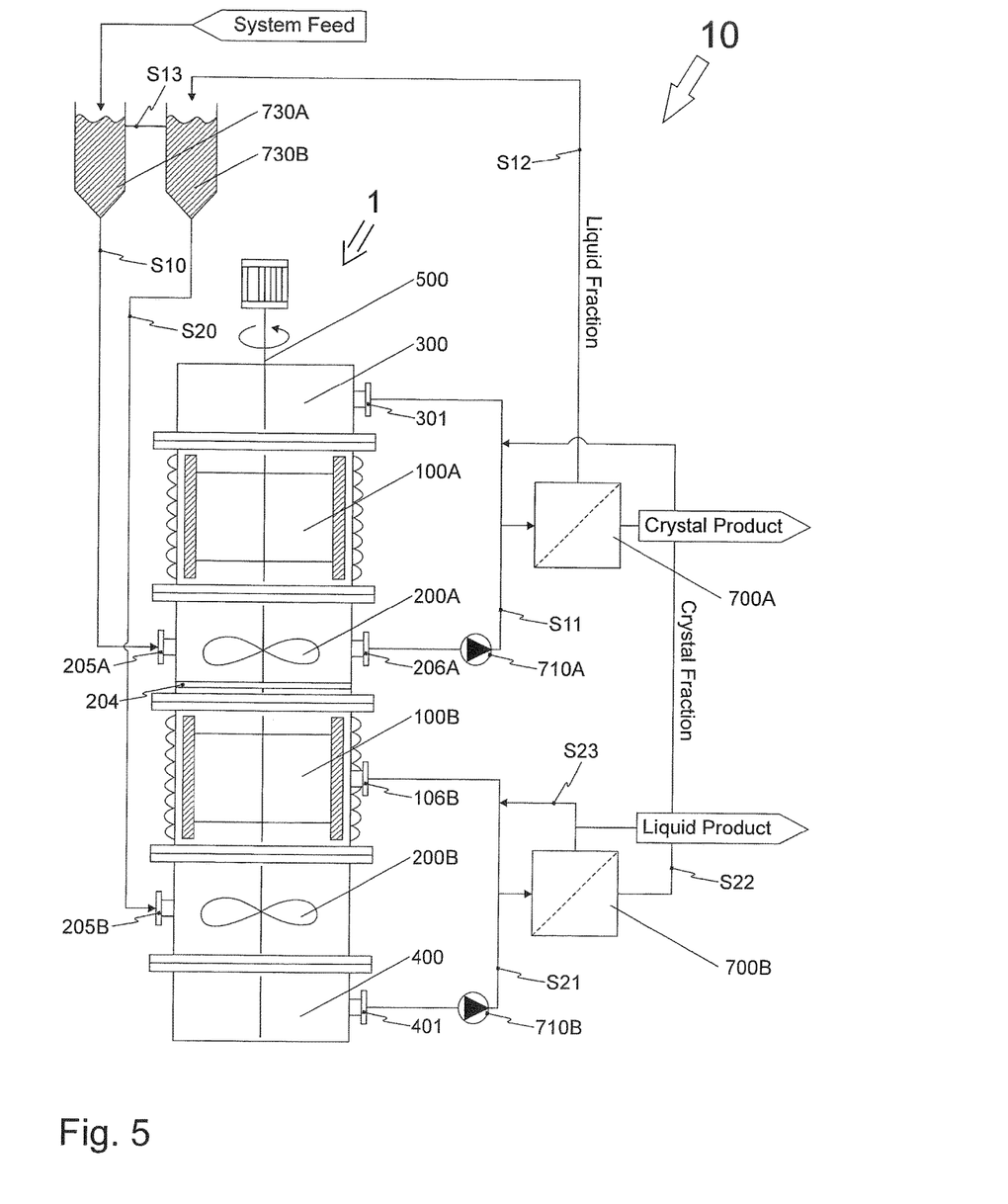
FIG. 5 shows a schematic view of an embodiment of a suspension crystallization system according to the invention comprising a modular sub-unit of the invention.

The two-stage suspension crystallization system 10 shown in FIG. 5 schematically illustrates another preferred embodiment of the present invention. Here, the system 10 comprises a two-stage modular sub-unit 1, one stage designated A and the other B, respectively, which are separated from each other by means of an intervening wall 204. The two stages are each carried out in a feed tank (730A, 730B), a crystallization segment (100A, 100B), a mixing segment (200A, 200B), a separating means (700A, 700B), and an external circulation pipe (S11, S21) provided with a circulation pump (710A, 710B), respectively. In order to achieve circulation in stage A, the external circulation pipe S11 is connected with the modular sub-unit 1 at one end via the outlet 206A of the mixing segment 200A and at the other end via the main supply conduit 301. Likewise, for the external circulation in stage B, external circulation pipe S21 is connected with the modular sub-unit 1 at one end via the main discharge conduit 401 and at the other end via the inlet 106B of the crystallization segment 100B. One skilled in the art will understand from FIG. 5 and its description how sub-units 1 may be equipped with appropriate additional intervening walls 204 etc. and additional segments for providing additional process stages.

The system 10 according to the embodiment of FIG. 5 having external circulation loops operates essentially as follows. The feed is drawn from tank 730A via pipe S10 and is introduced to the modular sub-unit 1 via inlet 205A of the first mixing segment 200A. Feeding in this manner has the advantage that the relatively warm feed will cause the smaller crystals to melt in said first mixing segment 200, which improves the subsequent solid-liquid separation step in the separating means 700A, which is fed by slurry taken from the external circulation pipe S11, as shown in the figure. At said separating means 700A, the pure crystals are separated from the liquid phase and drawn from the system 10. The essentially crystal-free liquid phase is carried to the feed tank 730B of the second stage B via pipe S12 for further concentration of the impurities in the liquid phase by additional crystallization. The feed tanks from both stages, A and B, are in fluid communication with each other via connection pipe S13. Said connection pipe S13 provides a simple means for controlling the liquid level in both tanks, 730A and 730B, respectively.

The feed of the second stage B is drawn from tank 730B via pipe S20 and is introduced to the modular sub-unit 1 via inlet 205B of the other first mixing segment 200B. Again, feeding in this manner has the advantage that the relatively warm feed will cause the smaller crystals to melt in said mixing segment 200B, which improves the subsequent solid-liquid separation step in the separating means 700B, which is fed by slurry taken from the external circulation pipe S21 shown in the figure. At said separating means 700B, the crystals are separated from the liquid phase. Subsequently part of the liquid phase is drawn from the system 10. The remaining liquid phase is returned to the external circulation pipe S21 via pipe S23. The separated crystal fraction of this second stage B is carried to the circulating slurry of stage A via pipe S22 and gets admixed to it. Thus, one can see from FIG. 5 that the equipment for the two stages A and B may often be quite similar.

In addition, FIGS. 1 to 5 shows the various caps and segments arranged in a substantially vertical arrangement to one another. A substantially vertical or substantially horizontal arrangement has the advantage of allowing one single central rotating axis 500 to drive both stirrers in mixing segments and rotating mechanical scraping means 104 in crystallization segments.

Figure 6:
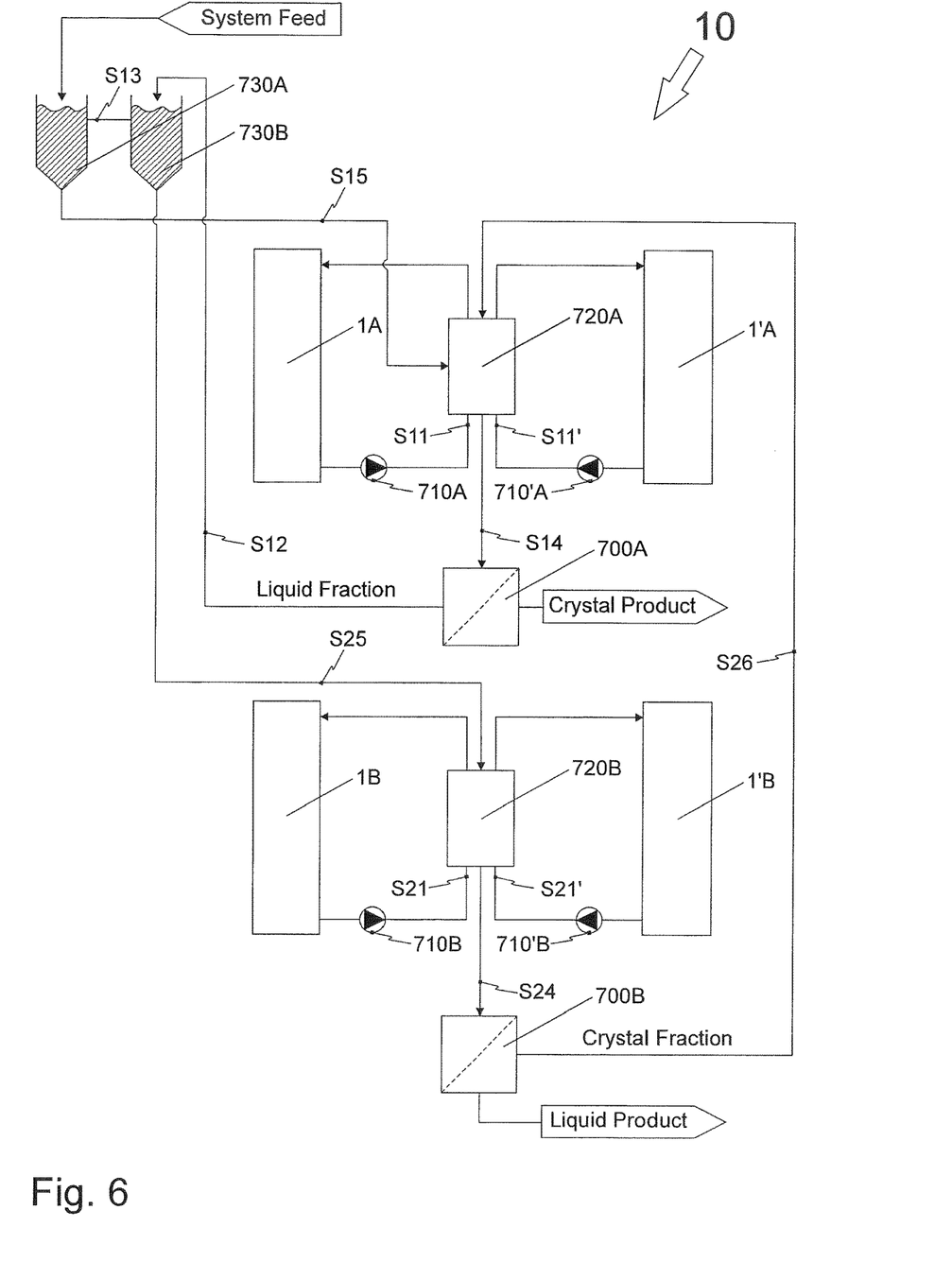
FIG. 6 shows a schematic view of an embodiment of a crystallization system according to the invention suitable for a 2-stage process and comprising four modular sub-units according to the invention.

The multi-crystallizer two-stage suspension crystallization system 10 that is shown in FIG. 6 schematically illustrates another preferred embodiment to the present invention. Here, the crystallization system 10 that is described in FIG. 5 comprises a plurality of modular sub-units (1 and 1'), which are connected to the separating means 700 via a buffering tank 720. Thus in this embodiment (compared to the embodiment in FIG. 5) the external circulation loop additionally includes the buffering tank 720. Said buffering tank 720 enables a homogeneous feed of constant quality to be fed to the separating means 700 and the modular sub-units (1 and 1'). The associated piping and pumps of the sub-units (1 and 1') are also designated using nomenclature such as x or x'.

The sub-unit 1 and system 10 of the invention may comprise auxiliaries as conventional and known in the crystallization art including pumps, feed tanks, heat exchangers, control systems, electrical supplies, coolant and heating fluid supplies and distributions, valves, pipes, lines, buffering tanks, and sensors for measuring such parameters as flow, temperatures, and levels. The process and the sub-unit 1 and system 10 of the invention may be conveniently controlled by means of a computer interface.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

REFERENCE NUMBERS 1 modular sub-unit
4 top
6 bottom
10 suspension crystallization system
100 first crystallization segment
101 first inlet of the first crystallization segment
102 cooling means
1021 cooled surface
103 crystal-growing volume
104 mechanical scraping and/or mixing means
105 first outlet of the first crystallization segment
110 further crystallization segment
200 first mixing segment
201 second inlet of the first mixing segment
202 mechanical mixing means
203 second outlet of the first mixing segment
204 intervening wall
210 further mixing segment
300 inlet cap
301 main supply conduit
302 third outlet of the inlet cap
400 outlet cap
402 third inlet of the outlet cap
500 central rotating axis
700 separating means
710 circulation pump 720 buffering tank
730 feed tank
2001 filtering means
S10 pipe between feed tank and mixing segment of stage A
S11, S21 external circulation pipe of stages A and B, respectively
S12 pipe between separating means of stage A and feed tank of stage B
S13 connection pipe between feed tanks A and B
S14 pipe between buffering tank of stage A and separating means of stage A
S15 pipe between feed tank of stage A and buffering tank of stage A
S20 pipe between feed tank and mixing segment of stage B
S22 pipe between separating means of stage B and external circulation pipe of stage A (S11)
S23 pipe between separating means of stage B and external circulation pipe of stage B (S21)
S24 pipe between buffering tank of stage B and separating means of stage B
S25 pipe between feed tank of stage B and buffering tank of stage B
S26 pipe between separating means of stage B and buffering tank of stage A

The invention claimed is:

1. A modular sub-unit for the production of crystals in a suspension crystallization system, said sub-unit comprising:
    a first crystallization segment having:
        a first inlet,
        a cooling means for cooling a slurry at a cooled surface to promote crystal formation and growth,
        a crystal-growing volume sufficient for the growth of said crystals,
        a mechanical scraping means for scraping the cooled surface and/or mixing a layer adjacent to the cooled surface together with a bulk of the slurry,
        a first outlet,
    a first mixing segment having:
        a second inlet,
        a mechanical mixing means for mixing the slurry from the crystallization segment and/or reducing the size of any crystal agglomerations, if present,
        a second outlet,
    wherein the crystallization segment and the mixing segment are in fluid communication with each other by means of the first outlet of the crystallization segment and the second inlet of the mixing segment,
    an inlet cap comprising a main supply conduit for the sub-unit and having a third outlet,
    an outlet cap comprising a main discharge conduit for the sub-unit and having a third inlet,
    at least one further crystallization segment additional to the first crystallization segment having a mechanical scraping means,
    optionally at least one further mixing segment additional to the first mixing segment, and wherein the mechanical mixing means of the first mixing segment and any optional further mixing segments comprise one or more baffles and optionally one or more stirrers,
    wherein the first crystallization segment and any further crystallization segments present in the sub-unit are all separated from each other by means of the first mixing segment or a further mixing segment, if present,
    a central rotating axis for providing energy for the mechanical scraping means of the crystallization segment, and also for any stirrers, if present, of the mechanical mixing means of the mixing segment, and wherein the central rotating axis provides energy for a mechanical scraping means of any further crystallization segments, and for any stirrers, if present, of a mechanical mixing means of any further mixing segments,
    and wherein the inlet cap is in fluid communication with any crystallization segments and any mixing segments present within the sub-unit by means of the third outlet
    and wherein the outlet cap is in fluid communication with any crystallization segments and any mixing segments within the sub-unit by means of the third inlet,
    and wherein any adjacent crystallization or mixing segments present within the sub-unit are either in direct fluid communication with each other or in indirect fluid communication with each other via external piping,
    and wherein the first crystallization segment, the first mixing segment, the at least one further crystallization segment and any optional further mixing segment, and the inlet and outlet caps are in substantially vertical arrangement to one another, and the inlet cap is either at a top of the sub-unit or at a bottom of the sub-unit.

2. The modular sub-unit of claim 1, wherein the modular sub-unit has a substantially circular cross-section and wherein at least a part of a cylindrical wall of said first crystallization segment comprises said cooled surface.

3. The modular sub-unit of claim 1, wherein the sub-unit has at least one further mixing segment additional to the first mixing segment.

4. The modular sub-unit of claim 1, wherein the first mixing segment or a further mixing segment comprises a filtering means suitable for extracting a stream from the sub-unit having a reduced crystal content from the slurry within said mixing segment.

5. The modular sub-unit of claim 4, wherein the filtering means is suitable for extracting a stream from the sub-unit having a substantially crystal free content.

6. The modular sub-unit of claim 1 embodied for a single stage process, wherein all of the crystallization segments, all of the mixing segments, the inlet cap, and the outlet cap are all in fluid communication, and wherein the fluid communication is embodied so as to not require interconnecting external piping.

7. The modular sub-unit of claim 1 embodied for a multi-stage process, wherein at least a first and a further crystallization segment are not in direct fluid communication with each other due to the presence of an intervening wall, and indirect communication between said not-directly communicating crystallization segments is provided via external piping.

8. The modular sub-unit of claim 7, wherein the modular sub-unit is embodied for a total number of process stages equal to the number of intervening walls plus one.

9. A suspension crystallization system comprising the modular sub-unit according to claim 1, wherein the sub-unit is in fluid communication with at least one separating means for separating a crystal phase from a fluid phase.

10. The suspension crystallization system according to claim 9, wherein the system additionally comprises a buffering tank in fluid communication between the sub-unit and the separating means.

11. The suspension crystallization system according to claim 9, wherein the separating means is selected from a centrifuge or a wash column.

12. A suspension crystallization process using the modular sub-unit of claim 1, comprising the steps of:

cooling a slurry at the cooled surface of the first crystallization segment to promote formation and growth of crystals, growing of said crystals in the first crystallization segment, using a mechanical scraping and/or mixing means to scrape the cooled surface and/or to mix a layer adjacent to the cooled surface together with a bulk of the slurry, using a first mixing segment to mix the slurry from the first crystallization segment, wherein the process is performed in the modular sub-unit of claim 1.

13. The suspension crystallization process according to claim 12, wherein a conditioning step of a slurry within the sub-unit is carried out within the first or a further mixing segment.

14. The suspension crystallization process according to claim 12, wherein the sub-unit is in fluid communication with one or more separating means for separating a crystal phase from a fluid phase, and wherein the process comprises the additional step of separating a crystal phase from a fluid phase.

* * * * *